(12) United States Patent
Huang

(10) Patent No.: US 7,459,649 B2
(45) Date of Patent: Dec. 2, 2008

(54) SAFETY SWITCH

(76) Inventor: Albert Huang, 3F, No. 146, Sec. 4, Chungking N. Rd., Taipei (TW)

( * ) Notice: Subject to any disclaimer, the term of this patent is extended or adjusted under 35 U.S.C. 154(b) by 149 days.

(21) Appl. No.: 11/522,567

(22) Filed: Sep. 18, 2006

(65) Prior Publication Data

US 2007/0068777 A1    Mar. 29, 2007

(30) Foreign Application Priority Data

Sep. 27, 2005    (TW) ............................. 94216628 U

(51) Int. Cl.
*H01H 9/20*    (2006.01)
(52) U.S. Cl. ...................... 200/334; 200/321
(58) Field of Classification Search ......... 200/330–334, 200/321, 332.1, 318.1, 333, 522
See application file for complete search history.

(56) References Cited

U.S. PATENT DOCUMENTS

| | | | | |
|---|---|---|---|---|
| 5,181,603 A | * | 1/1993 | Mori et al. ............... | 200/302.1 |
| 5,894,116 A | * | 4/1999 | Da Dalt .................... | 200/43.04 |
| 6,303,884 B1 | * | 10/2001 | Hou et al. .................. | 200/86.5 |
| 6,722,869 B2 | * | 4/2004 | Todokoro ...................... | 425/9 |
| 7,232,970 B1 | * | 6/2007 | Chen ......................... | 200/332.2 |
| 7,297,888 B2 | * | 11/2007 | Kovacic et al. .............. | 200/321 |

\* cited by examiner

*Primary Examiner*—Michael A Friedhofer
*Assistant Examiner*—Lisa N Klaus
(74) *Attorney, Agent, or Firm*—Jackson Walker, LLP

(57) ABSTRACT

A safety switch is a shell and has a base, a cover and two fasteners. The fasteners are detachably mounted on the base and the cover. The fasteners are made of resilient material more resilient than material for the base and the cover so the safety switch can keep the fastener from being broken. Furthermore, the fasteners can be arranged in different sizes to allow the safety switch to fit with different panels.

3 Claims, 10 Drawing Sheets

SAFETY SWITCH

BACKGROUND OF THE INVENTION

1. Field of Invention

The present invention relates to a safety switch, and more particularly to a safety switch that can cut off a current circuit when an electrical current on the current circuit is overhigh.

2. Description of the Related Art

A safety switch is provided in a distribution box to prevent a high electrical current from causing an accident. The safety switch is composed of a shell, a first conducting strip and a second conducting strip mounted in the shell, and a bimetal strip securely mounted on the first conducting strip. The bimetal strip is made of two metal plates having different thermal expansion coefficients, is electrically connected to the second conducting strip.

Whether do functions of the safety switch achieve is dependent on the flexibility of the bimetal strip. In a conventional safety switch, a button presses against the bimetal strip. To separate the bimetal strip from the second conducting strip, a distortion force provided by the bimetal strip due to the heavy current has to be bigger than a biasing force applied by the button to the bimetal strip. If the biasing force provided by the button is large, the distortion of the bimetal strip will not be immediately and a product will be damaged because of the heavy current not being timely interrupted.

With reference to FIG. 10, a conventional safety switch has a base (60) with a fastener and a cover (70) with a fastener (71). The fasteners are respectively formed from the base (60) and the cover (70). However, the conventional safety switch has two disadvantages:

1. The base (60) and the cover (70) have to be made by a heat-resistant material to endure high temperature, but to reduce the resilience of the fasteners (71) of the base (60) and the cover (70). When the safety switch is assembled, the fasteners (71) are pressed and are easily broken.

2. The conventional safety switch is mounted merely in a specific panel and has a low practicality.

To overcome the shortcomings, the present invention provides a safety switch to mitigate or obviate the aforementioned.

SUMMARY OF THE INVENTION

The primary objective of the present invention is to provide a safety switch that can cut off a current circuit when an electrical current on the current circuit is overhigh.

To achieve the objective, the safety switch is a shell and has a base, a cover and two fasteners. The fasteners are detachably mounted on the base and the cover. The fasteners are made of resilient material more resilient than materials for the base and the cover so the safety switch can solve the problem of that the fasteners of the conventional safety switch are easily broken. Furthermore, the fasteners can be arranged in different sizes to allow the safety switch to fit with different panels.

Other objectives, advantages and novel features of the invention will become more apparent from the following detailed description when taken in conjunction with the accompanying drawings.

DETAILED DESCRIPTION OF THE INVENTION

Figure 1:
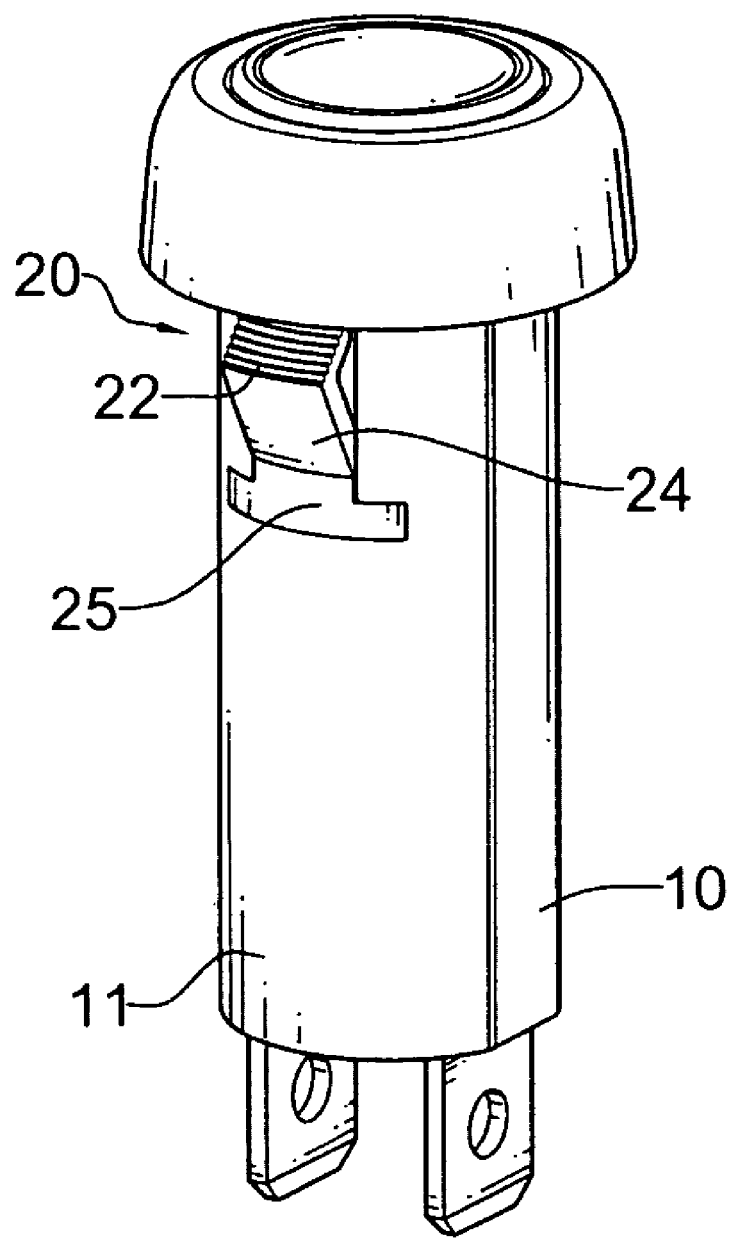
FIG. 1 is a perspective view of a first variant of a safety switch in accordance with the present invention.

With reference to FIGS. 1, 3, 6 and 9, a safety switch in accordance with the present invention can be mounted through a panel (30, 30A and 30B) and has a base (10), a cover (11) and two fasteners (20, 20A and 20B). The panel (30, 30A and 30B) has a thickness, an upper surface, a lower surface and a through hole (31). The through hole (31) allows the safety switch to be mounted through the through hole (31) and have an inner edge and a shape and may have different dimensions.

Figure 2:
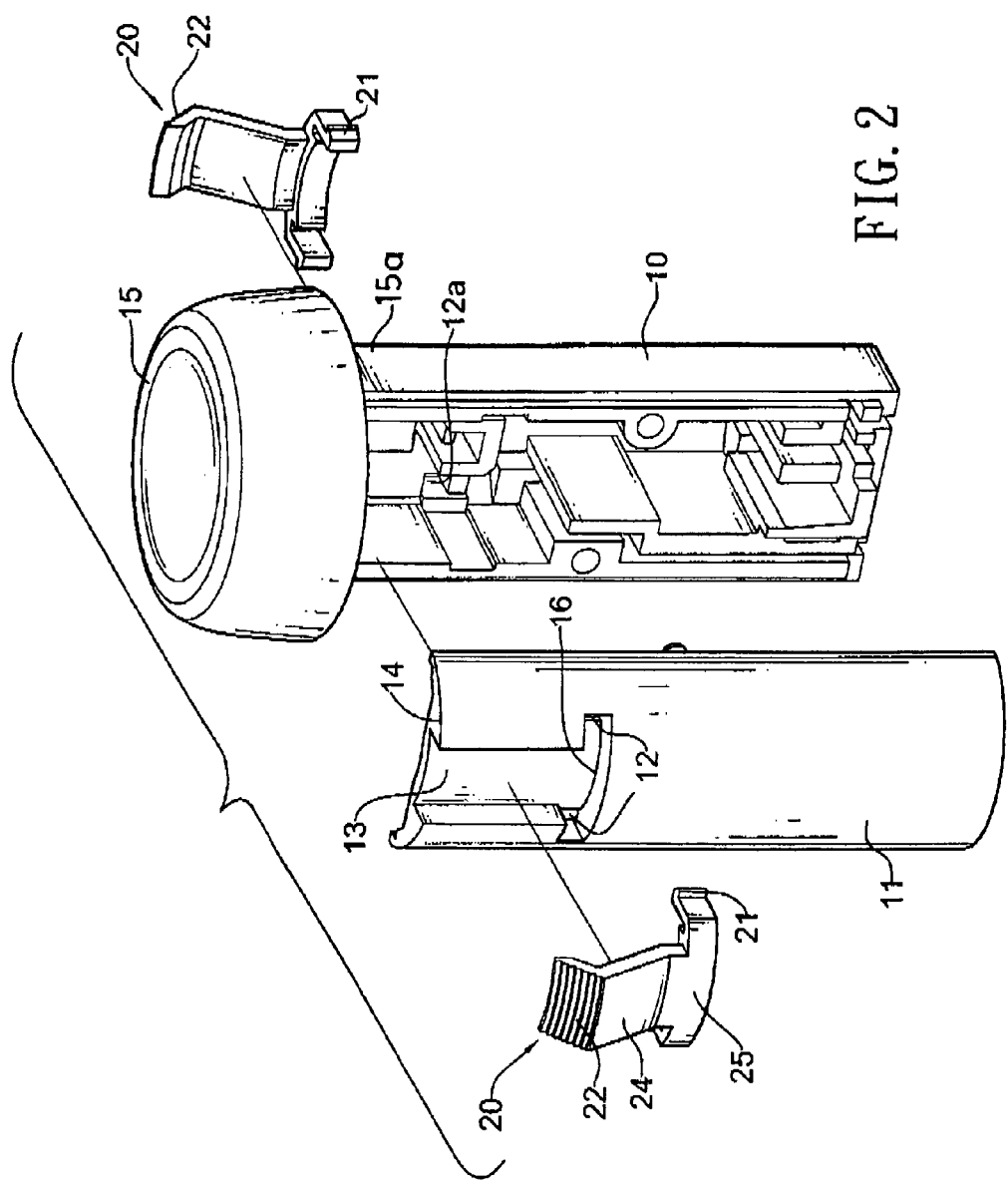
FIG. 2 is an exploded perspective view of the safety switch in FIG. 1.
Figure 5:
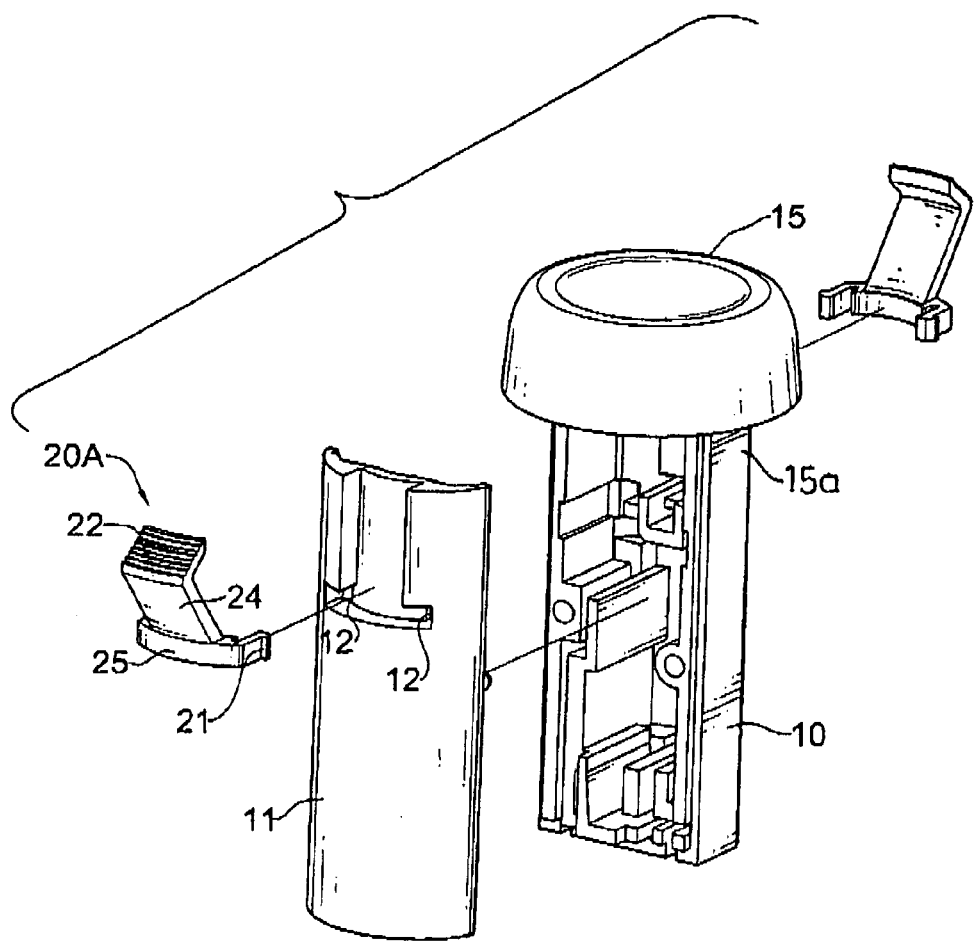
FIG. 5 is an exploded perspective view of the safety switch in FIG. 4.
Figure 8:
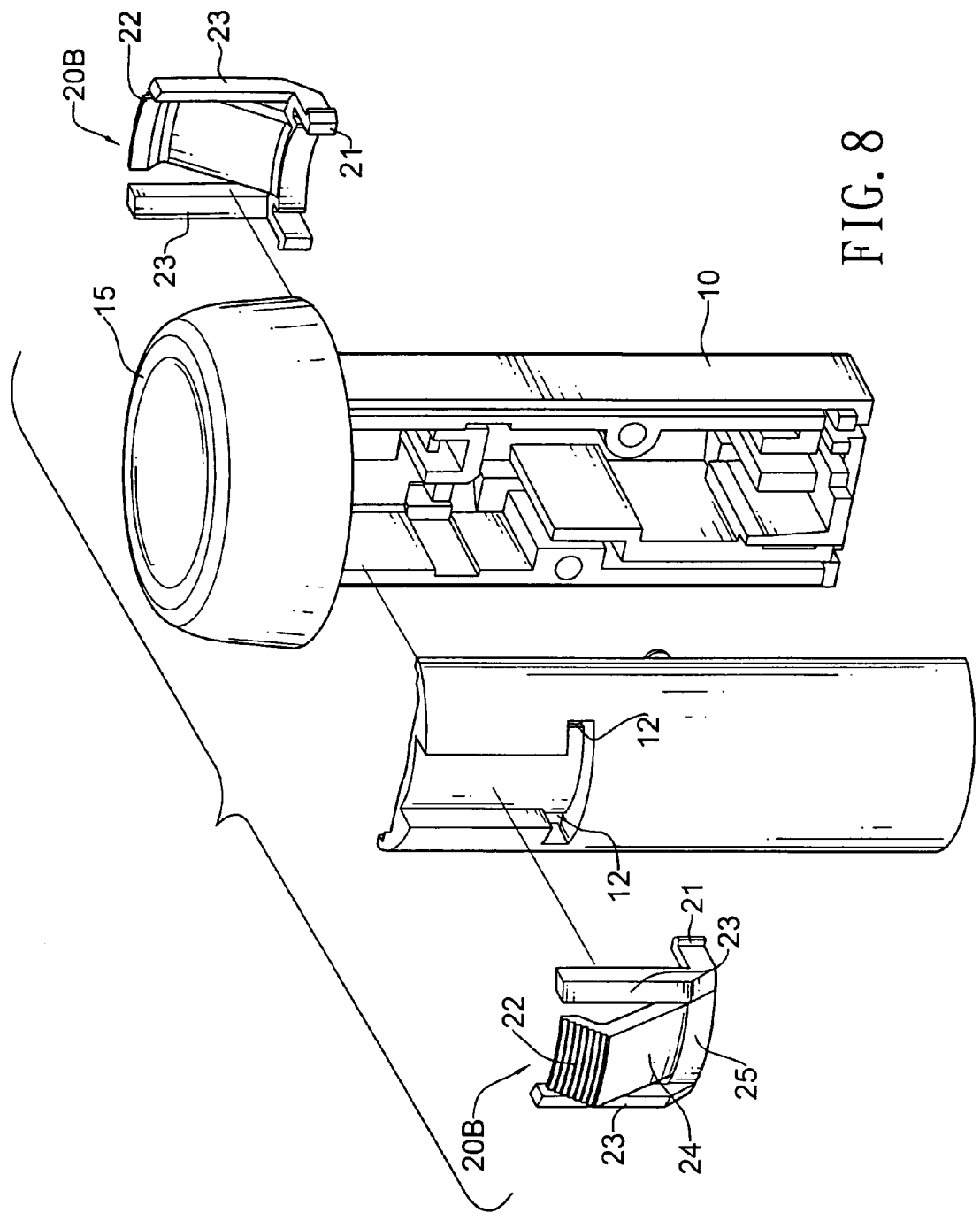
FIG. 8 is an exploded perspective view of the safety switch in FIG. 7.
Figure 9:
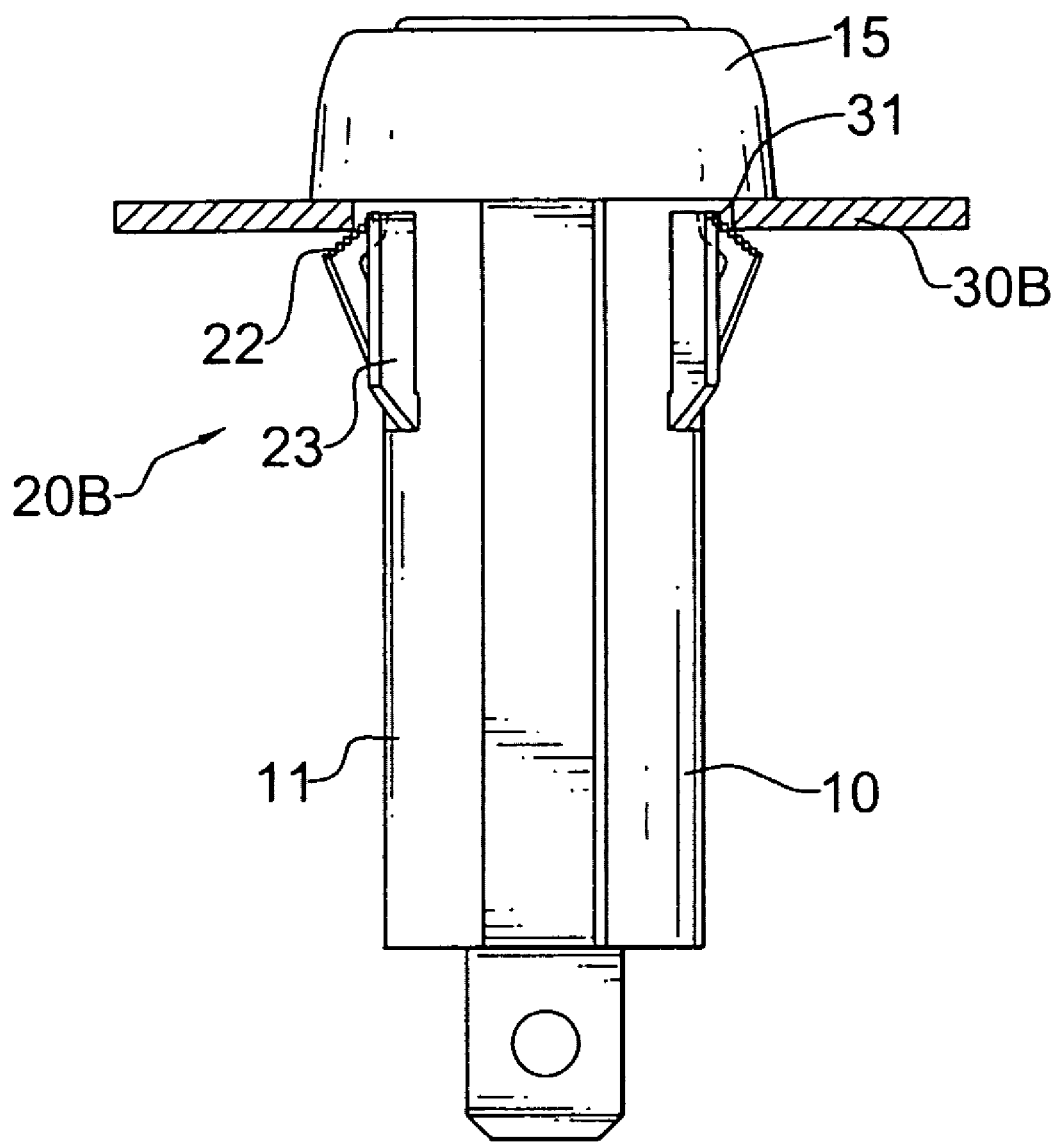
FIG. 9 is an operational side view of the safety switch in FIG. 7 with the safety switch mounted through a thin panel.
Figure 10:
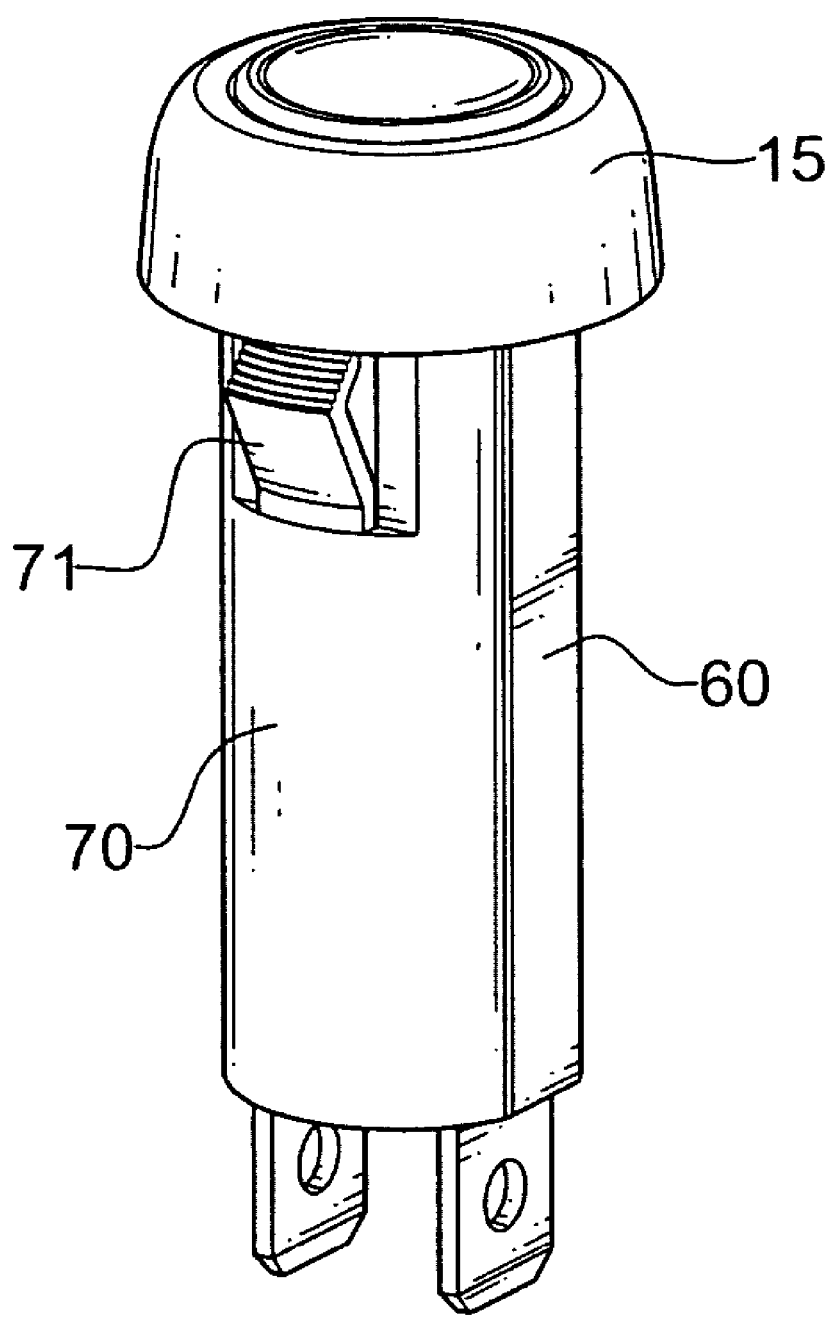
FIG. 10 is a perspective view of a conventional breaker in accordance with the prior art.

With further reference to FIGS. 2, 5 and 8, the base (10) is mounted in the through hole (31) of the panel (30, 30A and 30B) and engages the panel (30, 30A and 30B) when the safety switch is assembled and in used. The base (10) has an outer surface, a top (15a), a cap (15) and a recess (13a). The cap (15) is formed on the top (15a) of the base (10) and is mounted on the upper surface of the panel (30, 30A and 30B) when the safety switch is assembled and in used. The recess is inverted-T-shaped, is defined in the outer surface close to the cap (15) of the base (10) and has a longitudinal passage (16a) and multiple holes (12a). The longitudinal passage is defined in the outer surface of the base (10). The holes are formed through the base (10) and communicate with the longitudinal passage.

The cover (11) detachably combines with the base (10) and is mounted through the through hole (31) of the panel (30, 30A and 30B) and engages the panel (30, 30A and 30B) when the safety switch is assembled and in used. The cover (11) is almost symmetric with the base (10) and has an outer surface, an upper end and a recess (13). The recess (13) is opposite to the recess of the base (10), is inverted-T shaped, is defined in the outer surface of the cover (11) adjacent to the upper end and has a longitudinal passage (16) and multiple holes (12). The longitudinal passage (16) is defined in the outer surface of the cover (11). The holes (12) are formed through the cover (11) and communicate with the longitudinal passage (16).

Figure 4:
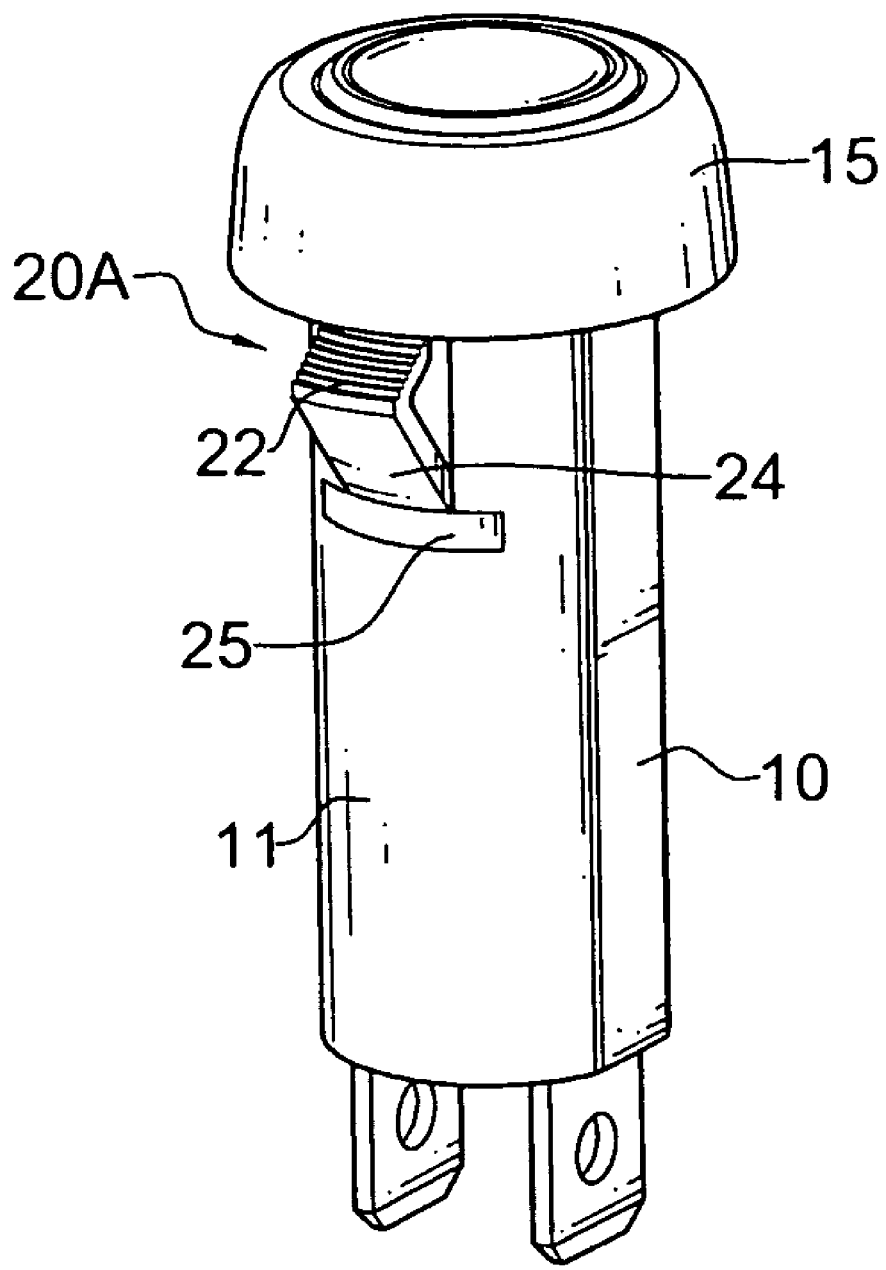
FIG. 4 is a perspective view of a second variant of a safety switch in accordance with the present invention.
Figure 7:
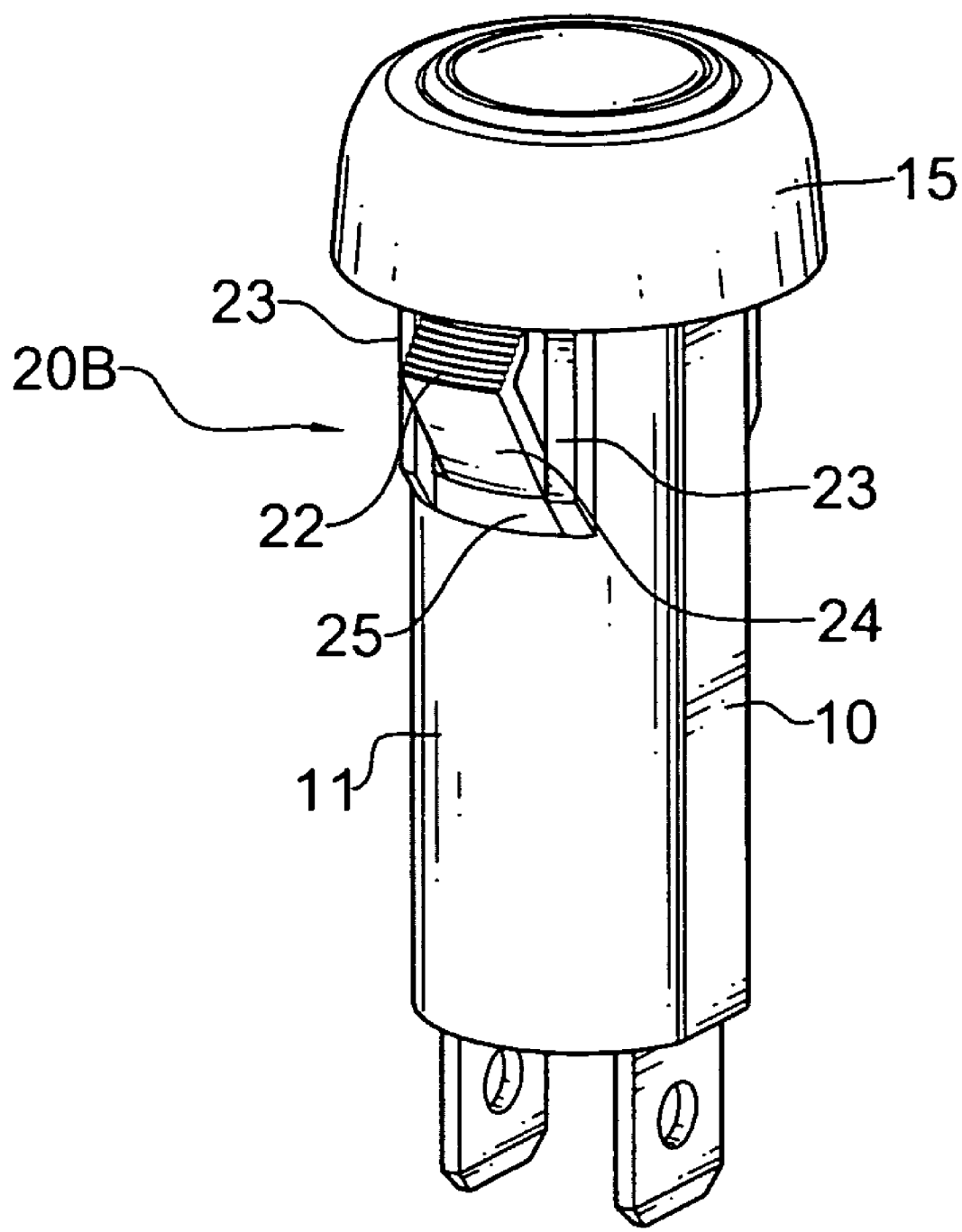
FIG. 7 is a perspective view of a third variant of a safety switch in accordance with the present invention.

With further reference to FIGS. 4 and 7, the fasteners (20, 20A and 20B) are inverted-T-shaped and are detachably mounted respectively in the recesses (13a, 13) of the base (10) and the cover (11). Each fastener (20, 20A and 20B) has a connecting segment (25), a 7-shaped resilient segment and an angle between the connecting segment (25) and the resilient segment and may have two bars (23).

The connecting segment (25) corresponds to and is mounted in the longitudinal passage (16a, 16) in one of the base (10) and cover (11) and has an outer surface and multiple protrusions (21). The protrusions (21) protrude form the connecting segment (25) and are detachably mounted respectively in the holes (12a, 12) in one of the base (10) and the cover (11).

The resilient segment connects to the connecting segment (25) and has a lower segment (24) and an upper segment (22). The lower segment (24) has an upper end and a lower end. The lower end of the lower segment (24) connects to the connecting segment (25). The upper segment (22) has a lower end and an upper end. The lower end of the upper segment (22) connects to the upper end of the lower segment (24). The upper end abuts the recess (13a, 13) in one of the base (10) and the cover (11) when the fasteners (20, 20A and 20B) are assembled with the base (10)/cover (11).

Figure 3:
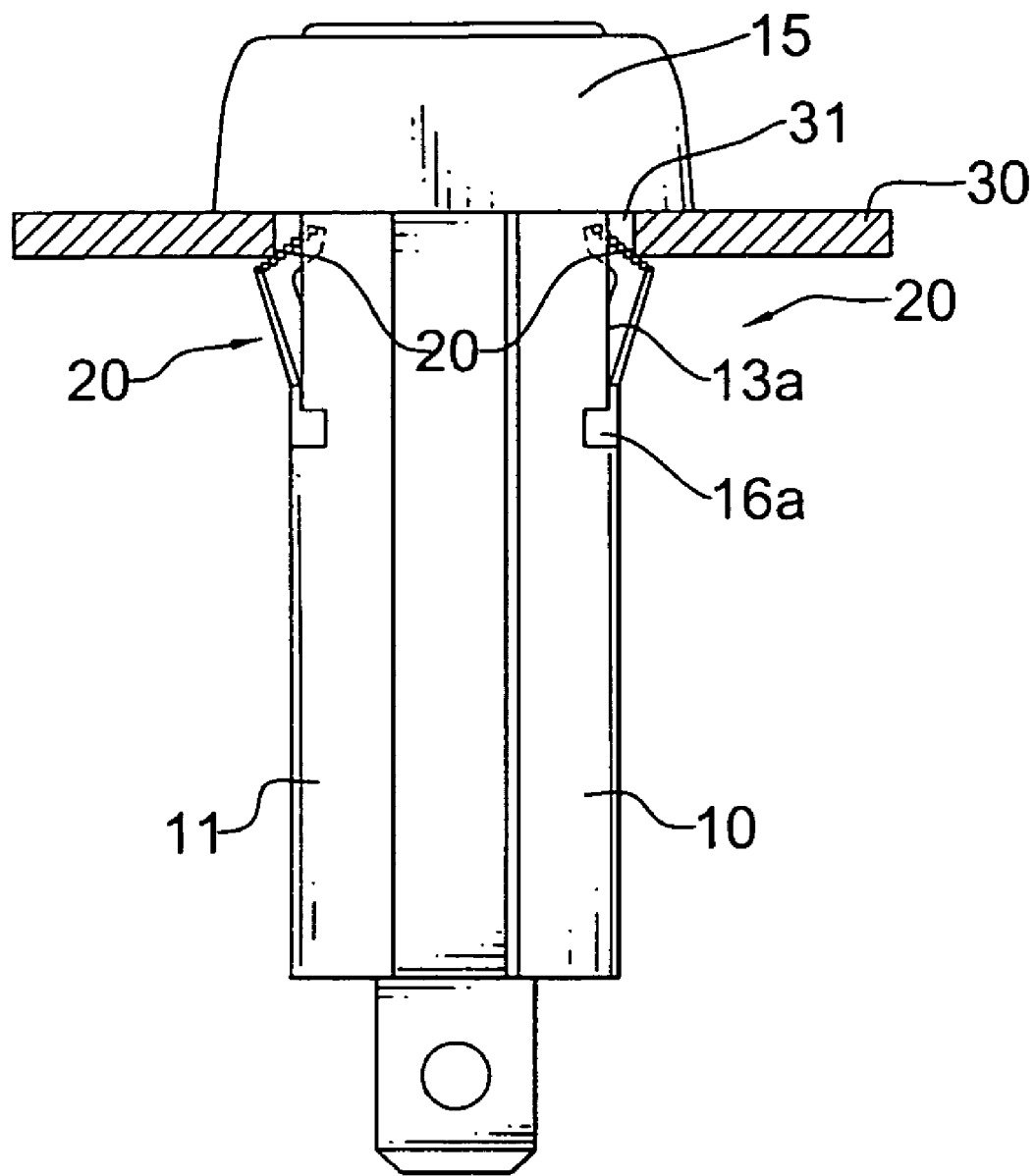
FIG. 3 is an operational side view of the safety switch in FIG. 1 with the safety switch mounted through a thick panel.
Figure 6:
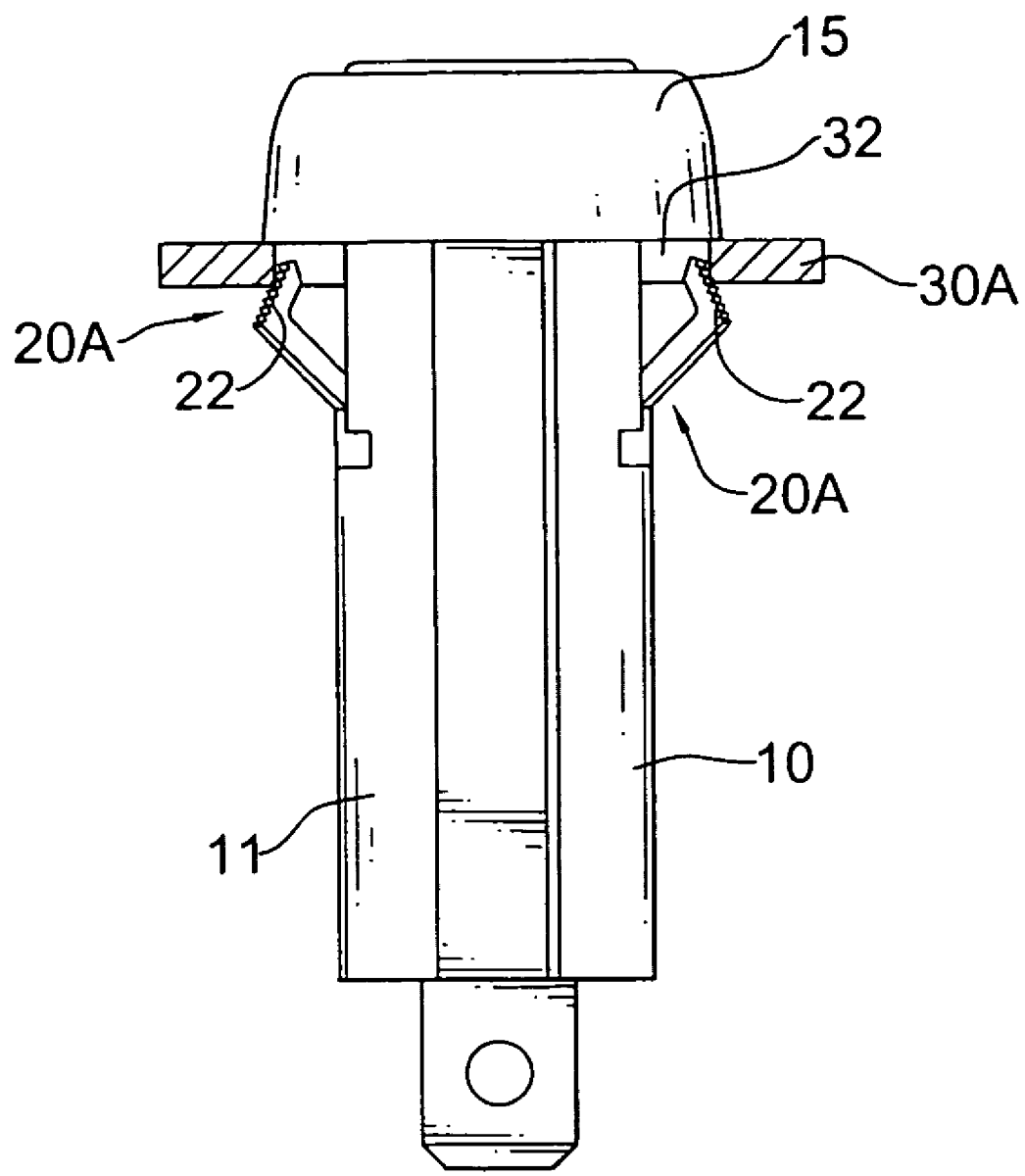
FIG. 6 is an operational side view of the safety switch in FIG. 4 with the safety switch mounted through a thick panel.

The angle between the connecting segment (25) and the resilient segment can be changed according to the dimensions of the through holes (31) of the panels (30, 30A and 30B) as FIG. 3 and 6.

The bars (23) are formed perpendicularly from the outer surface of the connecting segment (25) and abut the outer surface adjacent to the recess (13a, 13) in one of the base (11) and the cover (10). The bars (23) abut the inner edge of the through hole (31) of the thin panel (30, 30A and 30B) as FIG. 9 to prevent the through hole (31) of the panel (30, 30A and 30B) from deforming.

Because the fasteners (20, 20A and 20B) of the safety switch are detachably mounted on the base (10) and the cover (11), the fasteners (20, 20A and 20B) can be made of material different from material for the base (10) and the cover (11). The material for the fasteners (20, 20A and 20B) has resilience better than that of the base (10) and the cover (11). Therefore the safety switch can solve the problem of that the fasteners (20, 20A and 20B) of the conventional safety switch are easily broken. Furthermore, the safety switch can be arranged in different sizes to allow the safety switch to fit with different panels (30, 30A, 30B).

Even though numerous characteristics and advantages of the present invention have been set forth in the foregoing description, together with details of the structure and function of the invention, the disclosure is illustrative only. Changes may be made in detail, especially in matters of shape, size and arrangement of parts within the principles of the invention to the full extent indicated by the broad general meaning of the terms in which the appended claims are expressed.

What is claimed is:

1. A safety switch comprising:
   a base having
      a top;
      a cap formed on the top of the base; and
      a recess defined in the base close to the cap and having
         a longitudinal passage defined in the base and having two ends; and
         multiple holes formed through the base and communicating with the longitudinal passage;
   a cover detachably combining with the base and having
      an upper end; and
      a recess being opposite to the recess of the base, defined in the cover close to the upper end having
         a longitudinal passage defined in the outer surface of the cover; and
         multiple holes formed through the cover and communicating with the longitudinal passage in the cover; and
   two fasteners detachably mounted respectively in the recesses of the base and the cover and each fastener having
      a connecting segment corresponding to and mounted in the longitudinal passage in one of the base and cover and having multiple protrusions protruding form the connecting segment and detachably mounted respectively in the holes in one of the base and the cover; and
      a resilient segment connecting to the connecting segment.

2. The safety switch as claimed in claim 1, wherein
the resilient segment having
   a lower segment having
      an upper end; and
      a lower end connecting to the connecting segment;
   an upper segment having
      a lower end connecting to the upper end of the lower segment; and
      an upper end abutting the recess in one of the base and the cover;
each fastener further has an angle between the connecting segment and the resilient segment.

3. The safety switch as claimed in claim 1, wherein
the base has an outer surface;
the cover has an outer surface; and
each fastener further has two bars formed perpendicularly from the outer surface of the connecting segment and abutting the outer surface adjacent to the recess in one of the base and the cover.

* * * * *